US007454297B2

(12) United States Patent
Balestra

(10) Patent No.: US 7,454,297 B2
(45) Date of Patent: Nov. 18, 2008

(54) SYSTEM AND METHOD FOR DETERMINING FATIGUE LIFE EXPENDITURE OF A COMPONENT

(75) Inventor: Chester L. Balestra, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/733,019

(22) Filed: Apr. 9, 2007

(65) Prior Publication Data

US 2007/0295098 A1 Dec. 27, 2007

Related U.S. Application Data

(63) Continuation-in-part of application No. 11/473,418, filed on Jun. 22, 2006, now abandoned.

(51) Int. Cl.
*G01L 1/00* (2006.01)

(52) U.S. Cl. ............................ 702/42; 702/34; 73/770; 73/760

(58) Field of Classification Search ................... 702/33, 702/34, 41–44, 141; 73/760, 763, 767, 770, 73/787, 810; 356/32
See application file for complete search history.

(56) References Cited

U.S. PATENT DOCUMENTS

| | | | | |
|---|---|---|---|---|
| 3,387,120 | A | 6/1968 | Funk et al. | |
| 4,046,002 | A * | 9/1977 | Murphy et al. | 73/116 |
| 4,336,595 | A * | 6/1982 | Adams et al. | 702/34 |
| 4,733,361 | A | 3/1988 | Krieser et al. | |
| 4,920,807 | A | 5/1990 | Stokes et al. | |
| 5,847,668 | A | 12/1998 | Morita et al. | |
| 6,449,565 | B1 | 9/2002 | Budrow et al. | |
| 6,460,012 | B1 * | 10/2002 | Welch et al. | 702/182 |
| 6,618,654 | B1 * | 9/2003 | Zaat | 701/29 |
| 7,181,959 | B2 | 2/2007 | Matsumoto et al. | 73/118.1 |

* cited by examiner

*Primary Examiner*—Manuel L Barbee
(74) *Attorney, Agent, or Firm*—Harness, Dickey & Pierce, P.L.C.

(57) ABSTRACT

A system and method for determining remaining fatigue life of a component experiencing stress/strain cycles. In one embodiment the fractional life expended per clock cycle of the component is determined and multiplied by a data type value indicating whether a full cycle, half cycle or no stress/strain amplitude information was present during a given clock cycle. The product is then summed with the result of the previously clock cycle, to produce a running total of the fractional life expended. The running total is then subtracted, at each clock cycle, from an initial fatigue life value, and the output represents the residual fatigue life remaining for the component.

17 Claims, 17 Drawing Sheets

SYSTEM AND METHOD FOR DETERMINING FATIGUE LIFE EXPENDITURE OF A COMPONENT

CROSS REFERENCE TO RELATED APPLICATION

The present application is a continuation-in-part of U.S. application Ser. No. 11/473,418, filed Jun. 22, 2006, and presently pending, and is hereby incorporated by reference into the present application.

FIELD

The present disclosure relates to systems and methods of tracking fatigue life of a component, and more particularly to a system and method that determines fractional fatigue life expended for a component as the component experiences stress/strain cycles, and generates information indicative of a remaining fatigue life of the component.

BACKGROUND

The statements in this section merely provide background information related to the present disclosure and may not constitute prior art.

The remaining service life of mechanical components and/or support structure that undergo cyclic stress/strain is generally not readily predictable. Previously developed systems have attempted to predict the remaining service life of a component based upon the total time or "regime of usage" that the component experiences stress/strain cycles. To ensure that a component is not used beyond its predicted life of usage, a component is often retired prematurely. Put differently, the component will be removed from service often with significant remaining service life, just to be certain that the component will not fail while it is in use, which could affect other parts of subsystems of a larger system in which the component is being used. In either event, attempting to predict the remaining usage life of a component that is subject to stress/strain cycles, or prematurely retiring the component from service, can be costly in terms of the time and labor required in removing and replacing the component. Also, it is conceivable that the component may be stressed beyond the regime-assigned values and thus may fail before the regime-allotted lifetime.

Thus, it would be highly desirable to provide a system that is able to monitor stress/strain cycles that a given component experiences during normal use, and from such information to provide a direct measure of the fatigue life of the component that is expended, and an indication of the remaining fatigue life of a component having a known fatigue life.

SUMMARY

The present disclosure is directed to a method and system that determines the fractional fatigue life of a component having a known fatigue life, and provides information indicative of the remaining fatigue life of the component. In one embodiment an amplitude analyzing system receives stress/strain amplitude values from one or more sensors located on, adjacent to, or in proximity to, the component being monitored. The amplitude analyzing subsystem analyzes and sorts the maxima and minima amplitude values received from the sensors and generates a plurality of amplitude range values. A processor uses the amplitude range values and known information on the fatigue life of the component being monitored to generate information indicative of the fractional life expended used during a given stress/strain cycle. The fractional fatigue life information is summed in an accumulator, and an output of the accumulator is fed into a summing circuit together with information pertaining to the known remaining fatigue life of the component at the start of an operating session. The summing circuit generates an output indicative of the remaining fatigue life of the component.

In one embodiment, the amplitude analyzing subsystem operates in connection with a clock circuit and generates amplitude stress/strain range values for each clock cycle that the clock provides. The amplitude analyzing subsystem also generates information indicating whether a particular amplitude range value is representative of a full cycle or a half cycle of amplitude stress/strain values, as well as whether or not no amplitude stress/strain values were generated for a given clock cycle.

The system and method can be used to predict fractional fatigue life cycle values of a material from essentially any type of monotonically decreasing stress-range-life cycle or strain-range-life cycle algorithm or methodology. In one specific embodiment the processor makes use of an inverse, modified universal slopes equation (MUSE) for determining the fractional life expenditure, per clock cycle, of the component.

In one embodiment, the amplitude analyzing subsystem makes use of the well known rain flow sorting and counting algorithm for sorting the amplitude maxima and minima values from the sensors to generate the amplitude stress/strain range values to produce full cycles and half cycles of amplitude range values.

The present system and method enables the stress/strain fatigue life of a component to be monitored and tracked, substantially in real time, and a continuously updated value of the remaining fatigue life of the component to be generated.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 8 is a graph illustrating a comparison of predicted fatigue life cycle points for Ti-6A1-4V material that was generated using the iMUSE algorithm (dashed lines) and the MUSE algorithm (solid line);

FIG. 9 is a graph illustrating a comparison of predicted fatigue life cycle points for 2014-A1-T6 material that was generated using the iMUSE algorithm (dashed line) and the MUSE algorithm (solid line);

FIG. 13 is a graph illustrating a comparison of predicted fatigue life cycle points for SAE 4340-350 BHN material using the iMUSE algorithm (in dashed lines) and the MUSE algorithm (in solid line);

FIG. 18 is a comparison of the fit of predicted fatigue life cycle points for SAE 4142-670HB material that was generated using the iMUSE algorithm (in dashed lines) and the Coffin-Manson algorithm (in solid line);

FIG. 19 is a comparison of the fit of predicted fatigue life cycle points for SAE 4142-450HB material that was generated using the iMUSE algorithm (in dashed lines) and the Coffin-Manson algorithm (in solid line)

DETAILED DESCRIPTION

The following description is merely exemplary in nature and is not intended to limit the present disclosure, application, or uses.

Figure 1:
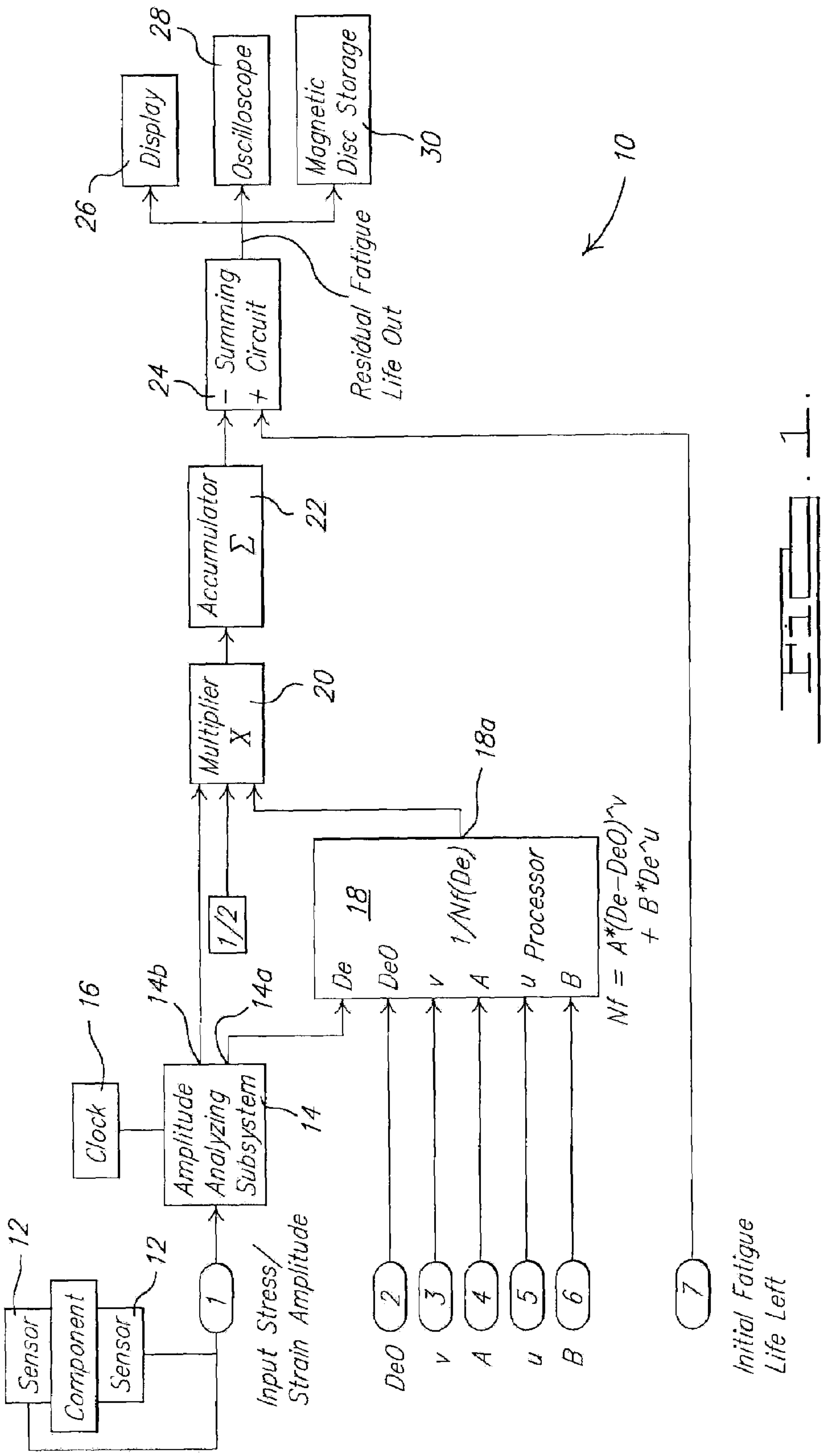
FIG. 1 is a simplified block diagram of one implementation of the system of the present disclosure.

Referring to FIG. 1, a system 10 in accordance with an embodiment of the present disclosure is illustrated. The system 10 generally operates to receive input stress/strain amplitude information and to monitor and process the information to maintain a periodically updated value of the fatigue life remaining for the component or structure being monitored.

In FIG. 1, a plurality of stress/strain sensors 12 operatively coupled to a component being monitored feed stress/strain amplitude data to a stress/strain amplitude analyzing subsystem 14. An example of this data is shown in a graph 31 in FIG. 2. The sensors 12 may comprise stress/strain gauges, accelerometers, or any other sensors that are able to supply the needed stress/strain data. An attitude or navigation system of a mobile platform such as aircraft, ship, or wheeled land vehicle may even be able to supply the stress/strain data.

The amplitude analyzing subsystem 14 operates to sort the maxima, minima, and intermediate amplitude values received from sensors 12 into full and half cycles of amplitude range values. A clock circuit 16 is used to supply clock pulses to the amplitude analyzing subsystem 14 so that for each clock cycle, the subsystem 14 sorts and produces either a full cycle amplitude value, a half cycle amplitude value, or no stress/strain information at all, if no such information is generated from subsystem 14 during that particular clock cycle. The output 14*a* from the amplitude analyzing system 14 represents an amplitude range value for each clock cycle. The amplitude range values are then input to a processor 18 for further processing. The amplitude analyzing system 14 also generates a "data type" value, at output 14*b*, that indicates whether each amplitude range value supplied to the processor 18 was obtained from either a full cycle or a half cycle of amplitude values, or whether no stress/strain information is being provided for that particular clock cycle. For example, the data type value may be assigned a number "2" if the data generated at output 14*a* represents a full cycle of amplitude range data, a number "1" if the data represents a half cycle, and the number "0" if no stress/strain information is present during that particular clock cycle.

These data type values are applied to a multiplier 20 that receives an output from the processor 18 and multiplies the received data type value by a factor of one half times the data type value. Thus, if a data type value of "2" is input to the multiplier 20, its output would be the value of the output of processor 18. If a data type value of "1" is input to the multiplier 20, its output will be one half of the value of the output of processor 18, and its output will be zero if the data type value being input is zero.

The processor 18 receives information obtained from an inverse MUSE (Modified Universal Slopes Equation) analysis pertaining to fatigue characteristics of the material that comprises the component being monitored, as well as the amplitude range values from the amplitude analyzing subsystem 14. The processor 18 uses this information to generate an output, for each clock cycle, that is related to the fractional fatigue life determined during the given clock cycle. This information is transmitted from an output 18*a* of the processor 18 to an input of the multiplier 20. The output from the multiplier 20 represents the fractional fatigue expended during a given clock cycle.

An accumulator 22 is used to maintain a running total of the fractional life of the component that is expended during each clock cycle. Thus, the accumulator 22 will be updated, with each clock cycle, with the fractional life expended data from the multiplier 20. The value of the data being stored therein remains the same or increases from clock cycle to clock cycle, depending upon the stress/strain amplitude range values being generated by the amplitude analyzing subsystem 14.

Figure 3:
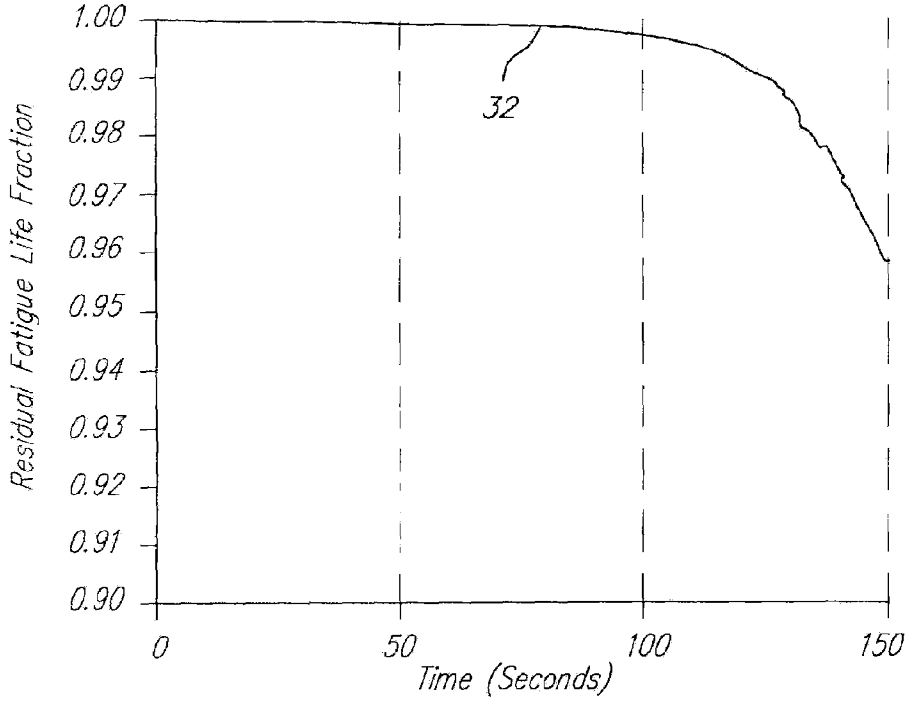
FIG. 3 is a graph of the remaining service life of the component being monitored, in relation to the stress/strain amplitude cycles illustrated in FIG. 2.

The system 10 also includes a summing circuit 24 that receives an output from the accumulator 22, as well as an "initial fatigue life" value for the component being monitored. The initial fatigue life value of the component represents the known, or best-estimate, of remaining fatigue life at the beginning of a usage session, or mission. An output of the summing circuit 24 thus represents the remaining fatigue life of the component. The output of the summing circuit 24 may be sent to a display 26, for example a CRT or LCD display, an oscilloscope 28, a magnetic storage medium 30, or any other component that may be desired for tracking or otherwise using the data of remaining fatigue life of the component. The graph 32 of FIG. 3 illustrates how the remaining fatigue life of the component can be visually indicated on a display.

The foregoing description relating to FIG. 1 has been provided to give the reader an overview of major components of the system 10. The following discussion will focus on the operation of the amplitude analyzing subsystem 14 and the processor 18, and the algorithms used with these two components.

Amplitude Analyzing Subsystem

Figure 2:
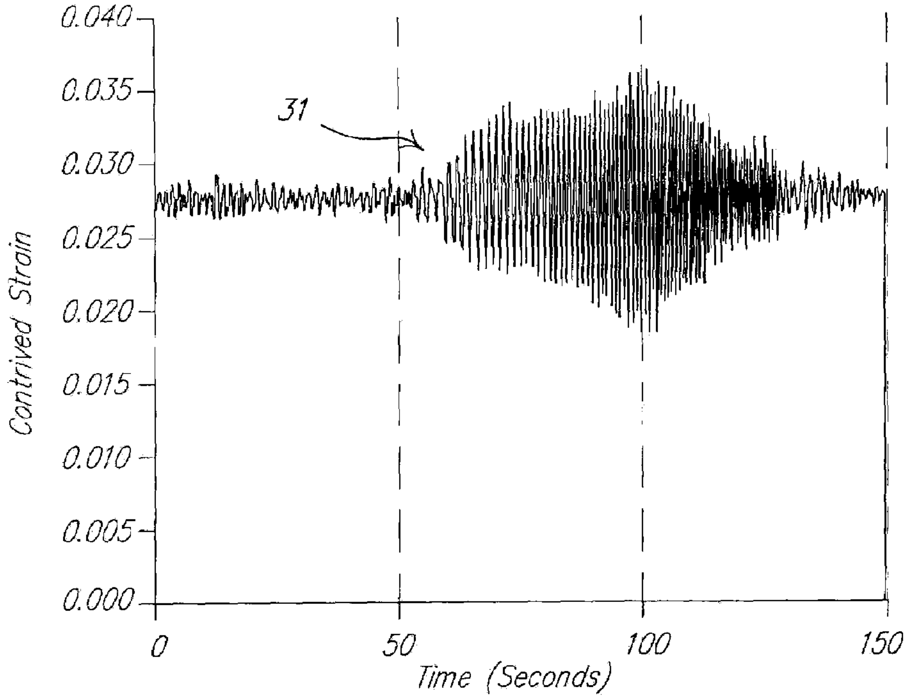
FIG. 2 is a graph of a plurality of cycles of stress/strain data that are generated by the stress/strain sensors that feed information into the amplitude analyzing subsystem of FIG. 1.
Figure 4:
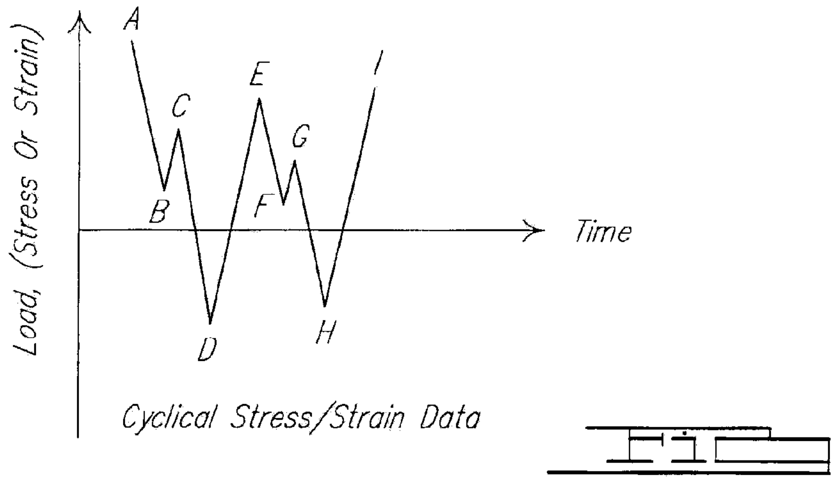
FIG. 4 is a graph of amplitude stress/strain values, illustrating a first operation of the rain flow algorithm used to sort and identify full cycles and half cycles of stress/strain amplitude values.
Figure 5:
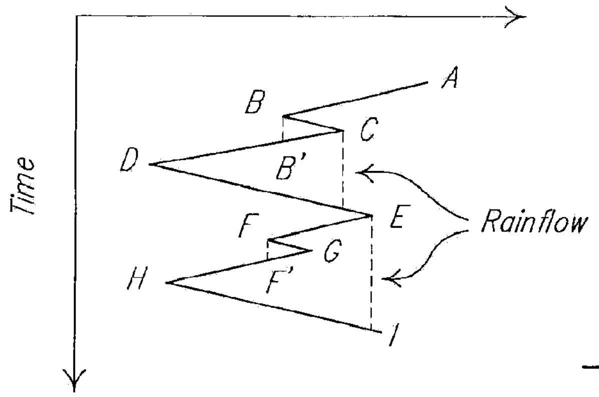
FIG. 5 is a diagram showing the amplitude information of FIG. 1 rotated 90° to better illustrate the "rain flow" manner in which the rain flow sorting algorithm pairs up maxima and minima amplitude values in FIG. 4 during the sorting process.
Figure 6:
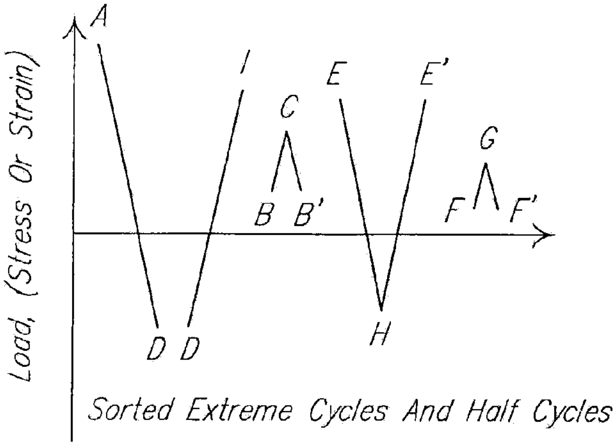
FIG. 6 illustrates the half and full cycles of amplitude data of FIG. 5 as sorted by the rain flow sorting algorithm.

The amplitude analyzing subsystem 14 may make use of any suitable algorithm that is able to identify the maxima and minima amplitude values from the stress/strain sensors 12, and to sort these values into amplitude range values defining either a full cycle or a half cycle. The graph 31 of FIG. 2 shows an exemplary input from one of the stress/strain sensors 12. One particular method for analyzing and sorting the amplitude values that make up the graph 31 is the well known "rain flow" sorting and cycle counting algorithm developed by Matsuishi and T. Endo, "Fatigue of Metals Subjected to Varying Stress", Japan Society of Mechanical Engineers Meeting, Fukuoka, Japan (March 1968), which is hereby incorporated by reference. FIGS. 4, 5 and 6 summarize the operations performed using the rain flow sorting and cycle counting method. In FIG. 4, the maxima and minima points, identified by letters "A"-"I", identify the maxima and minima amplitude values of a small portion of graph 31 in FIG. 2. In FIG. 5, the first operation is in starting from the highest peak, in this example amplitude value A, and going to the amplitude value where the first amplitude reversal begins to occur, that point being amplitude value "B" in FIG. 5. The rain flow "runs down" and continues unless either the magnitude of the following peak (or the following valley, if one had started from the lowest valley in FIG. 4) is equal to or larger than the peak (or value) from which it initiated, or previous rain flow is encountered. This same procedure is repeated for each amplitude reversal. The sorted full cycles and half cycles are illustrated in FIG. 6. Amplitude values "A" and "D" represent a half cycle, and its corresponding amplitude range value would be the difference between the amplitude values defining points A and D. One full cycle is made up of amplitude values "C", "B" and "B'", with the amplitude range of this particular full cycle being defined by the difference in the amplitude values C and B.

The above-described rain flow sorting and cycle counting method is one suitable form for generating the amplitude range values that are output to the processor 18, however other suitable algorithms could be used. For example, the range pair counting method counts a strain range as a cycle if it can be paired with a subsequent straining of equal magnitude in the opposite direction. Except when half cycles are being counted, the rain flow counting method reduces to the range pair method.

Operation of Processor

One methodology by which the processor 18 is able to determine fractional life expenditure per cycle is by implementing an inverse MUSE (Modified Universal Slopes Equation) developed by U. Muralidharan and S. S. Manson. This algorithm is illustrated below:

$$\Delta\varepsilon(N_f) = 0.0266D^{0.155}\left[\frac{\sigma_u}{E}\right]^{-0.53}N_f^{-0.56} + 1.17\left[\frac{\sigma_u}{E}\right]^{0.832}N_f^{-0.09}, \quad (1)$$

where $\Delta\epsilon(N_f)$ is the component material strain range (from minimum to maximum values) as a function of the total number of fatigue cycles $N_f$ at that strain range;

D is the ductility of the material determined by D=−In(1−RA);

RA is the fractional reduction in cross-sectional area of a standard tensile test specimen of the material at fracture;

$\sigma_u$ is the ultimate tensile (stress) strength of the specimen; and

E is the material's Young's modulus of elasticity.

For one stress/strain cycle at a strain range $\Delta\epsilon$, a corresponding fraction $1/N_f$ of fatigue life of the material is expended.

Strain, or stress, relationships which are functions of total fatigue are of limited utility for tracking and predicting remaining fatigue life as a function of cyclic strain, or stress, in practical situations where stress values can vary with condition of usage. Also, it is known that for most practical situations where the intended material in-use stresses are below the elastic limit, the well known Palmgren-Miner cumulative damage law is applicable for the calculation of total fractional fatigue life expenditure as determined by the number of cycles ($n(\Delta\epsilon_i)$ spent at strain range $\Delta\epsilon_i$):

$$\text{Fatigue Life Fraction} = \sum_i \frac{n(\Delta\varepsilon_i)}{N_f(\Delta\varepsilon_i)} \rightarrow 1 \text{ at End of Life} \quad (2)$$

Figure 7:
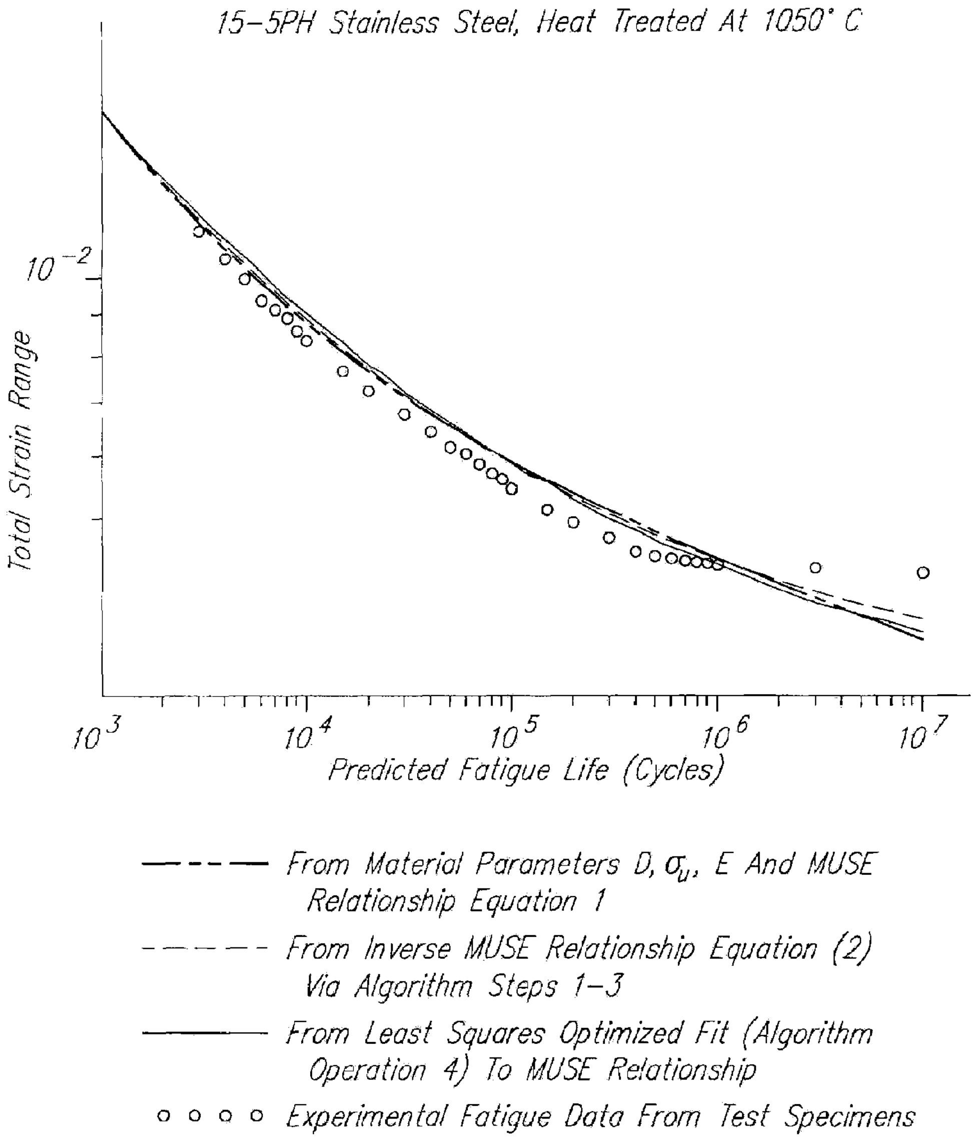
FIG. 7 is a exemplary graph of various fatigue curves for 15-5PH stainless steel.
Figure 5:
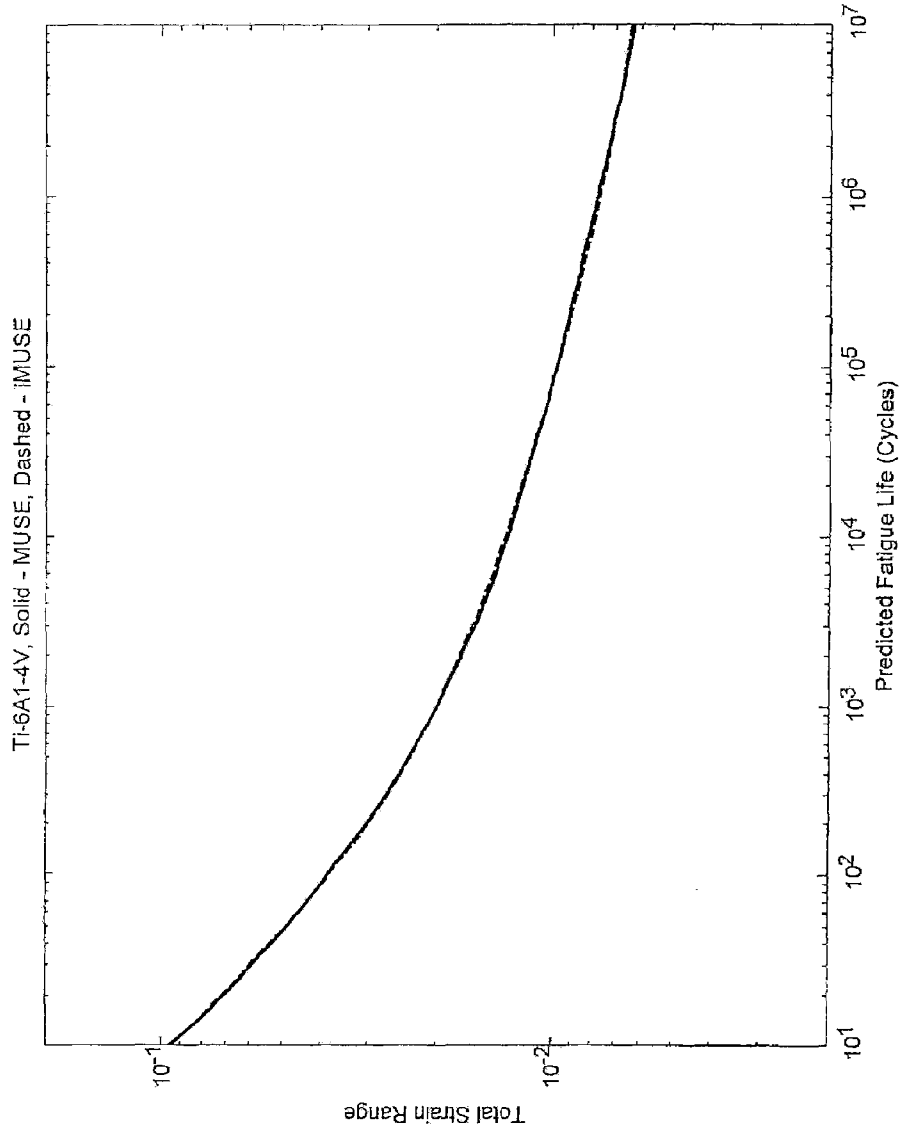
Figure 6:
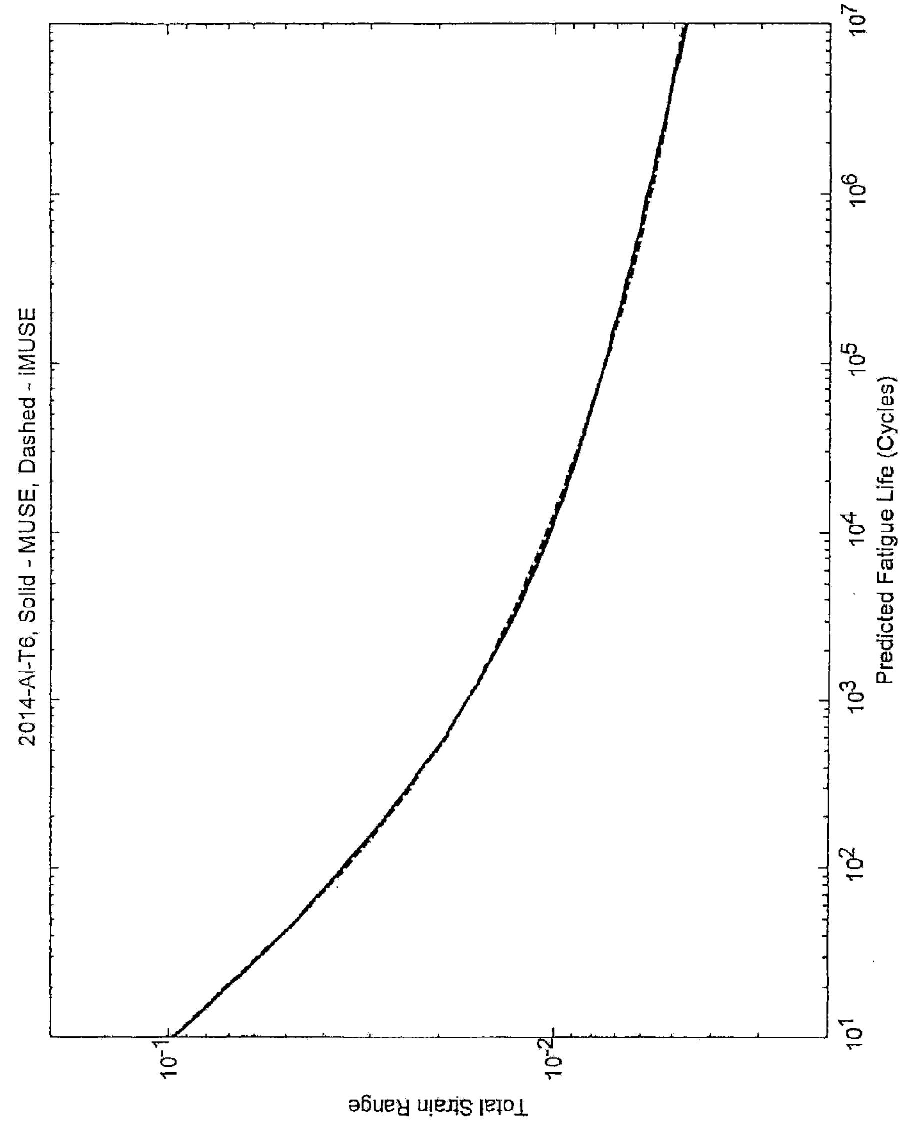
Figure 10:
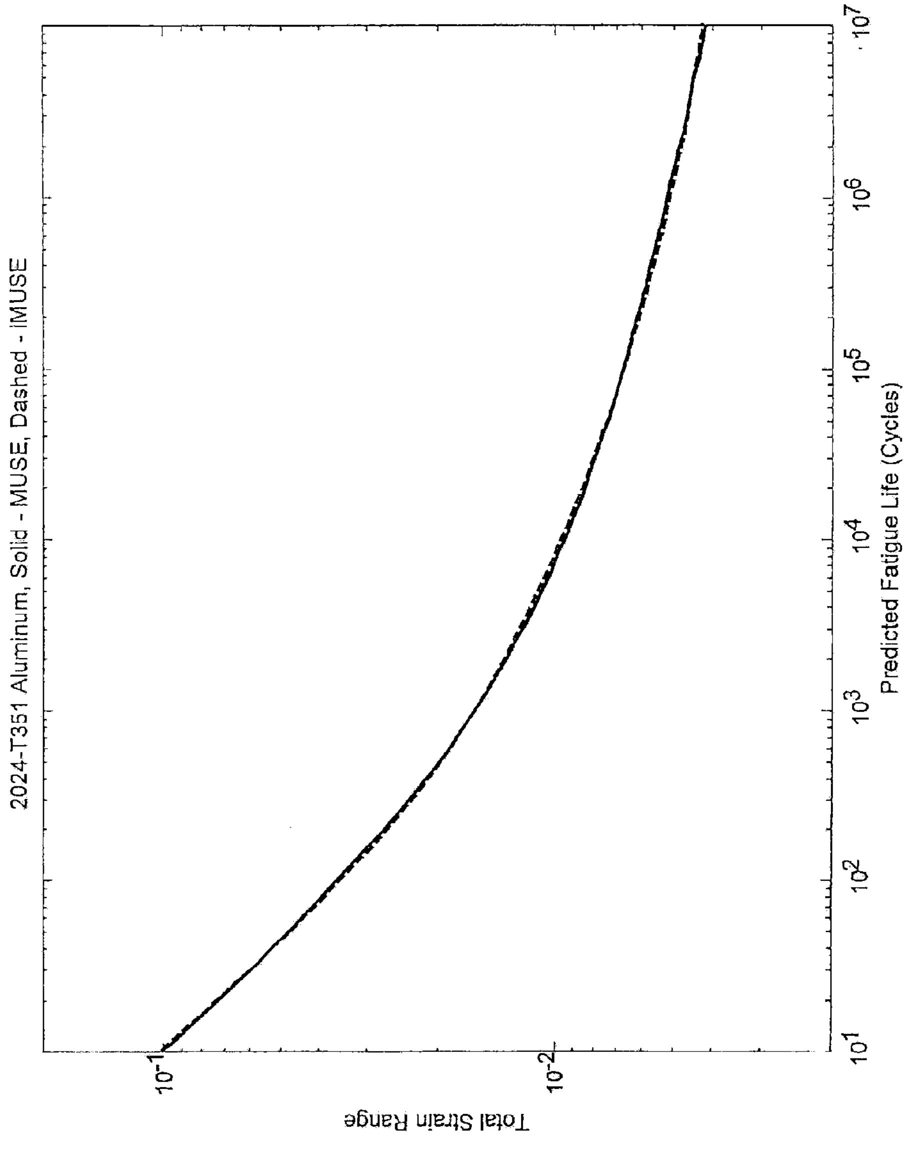
FIG. 10 is a graph illustrating a comparison of predicted fatigue life cycle points for 2024-T351 aluminum material that was generated by using the iMUSE algorithm (in dashed lines) and the MUSE algorithm (in solid line)
Figure 11:
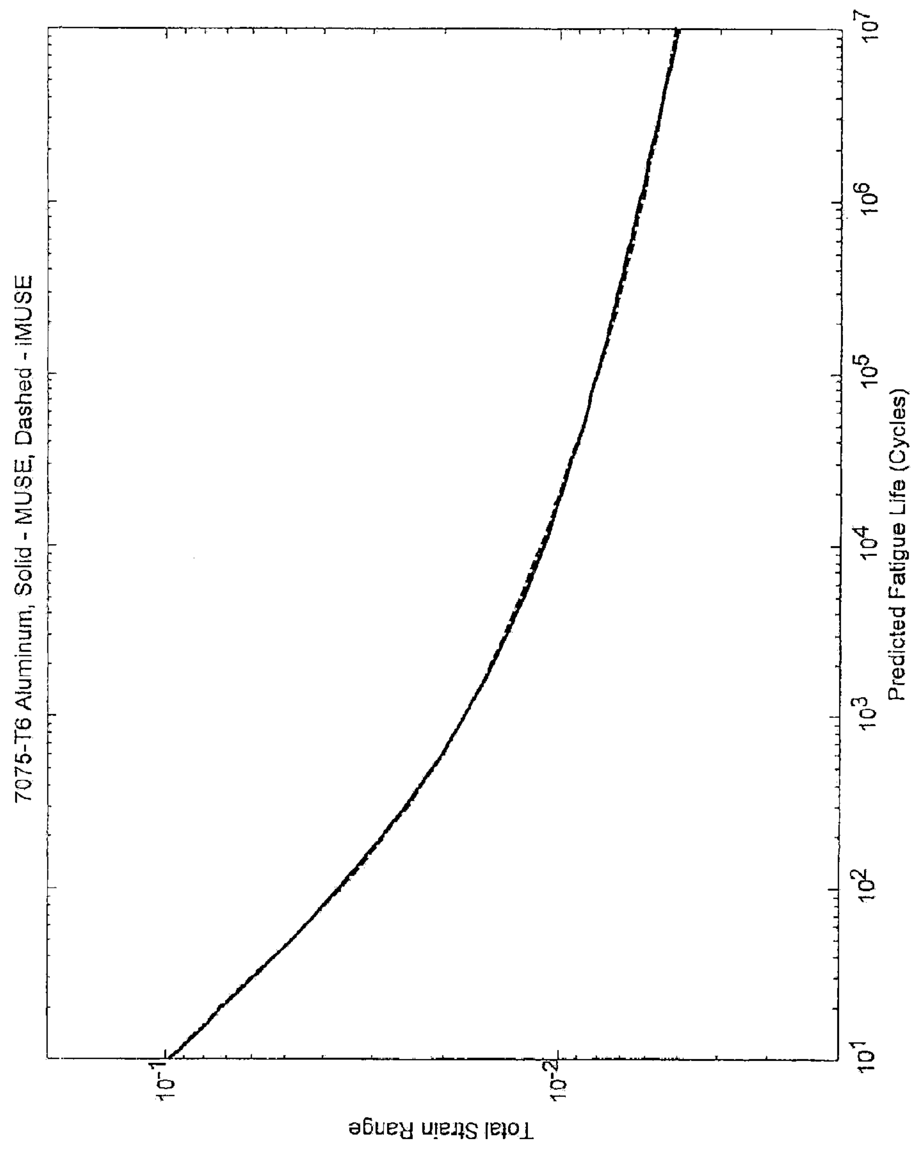
FIG. 11 is a graph illustrating a comparison of predicted fatigue life cycle points for 7075-T6 aluminum material that was generated using the iMUSE algorithm (dashed lines) and the MUSE algorithm (solid line)
Figure 12:
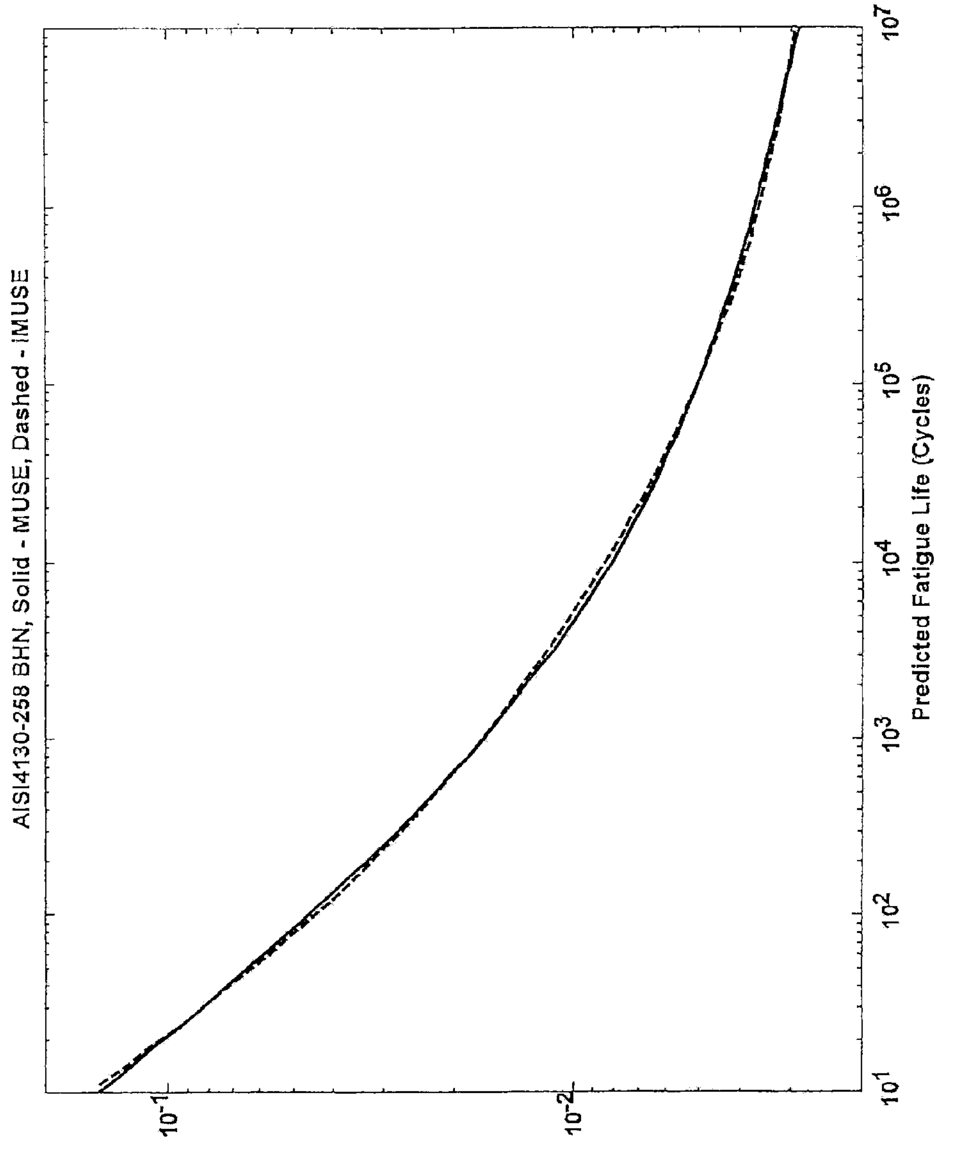
FIG. 12 is a graph illustrating a comparison of predicted fatigue life cycle points for AISI4130-258 BHN material that was generated using the iMUSE algorithm (dashed lines) and the MUSE algorithm (solid line)
Figure 12:
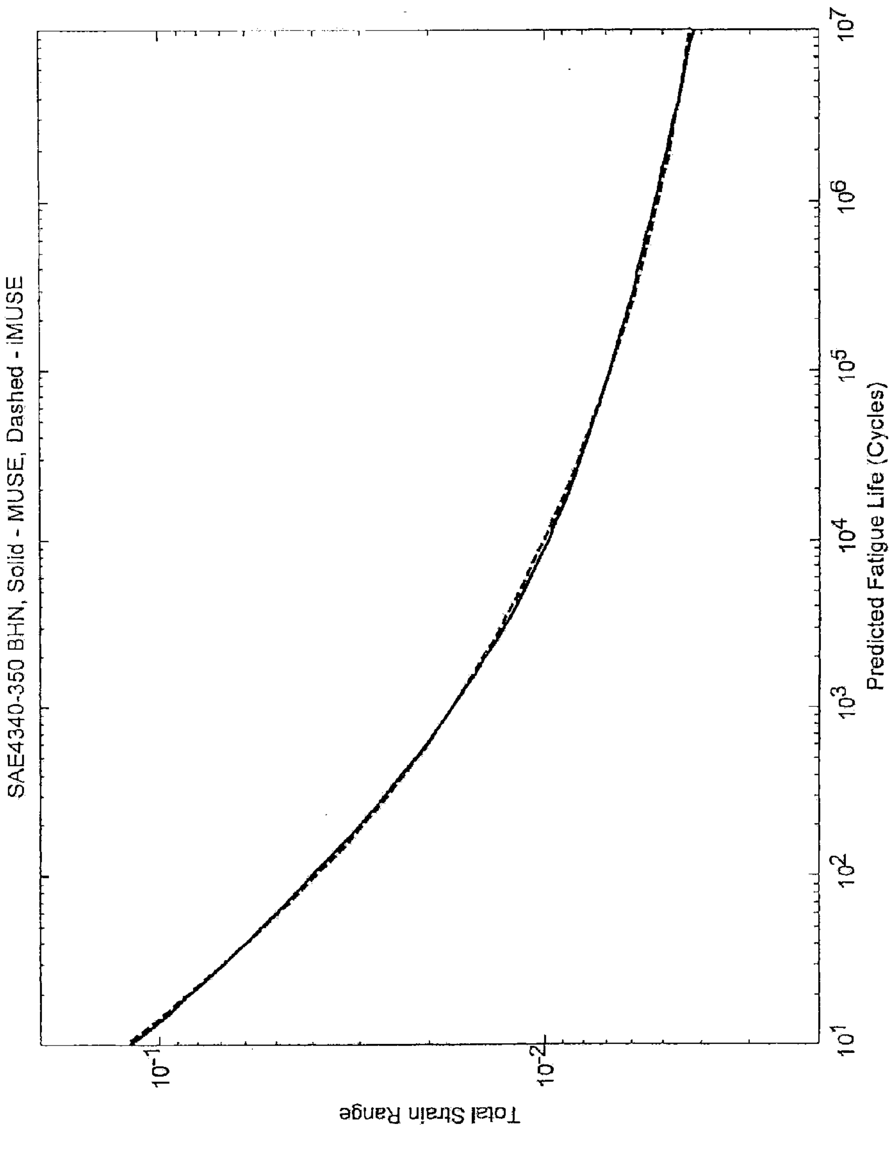
Figure 14:
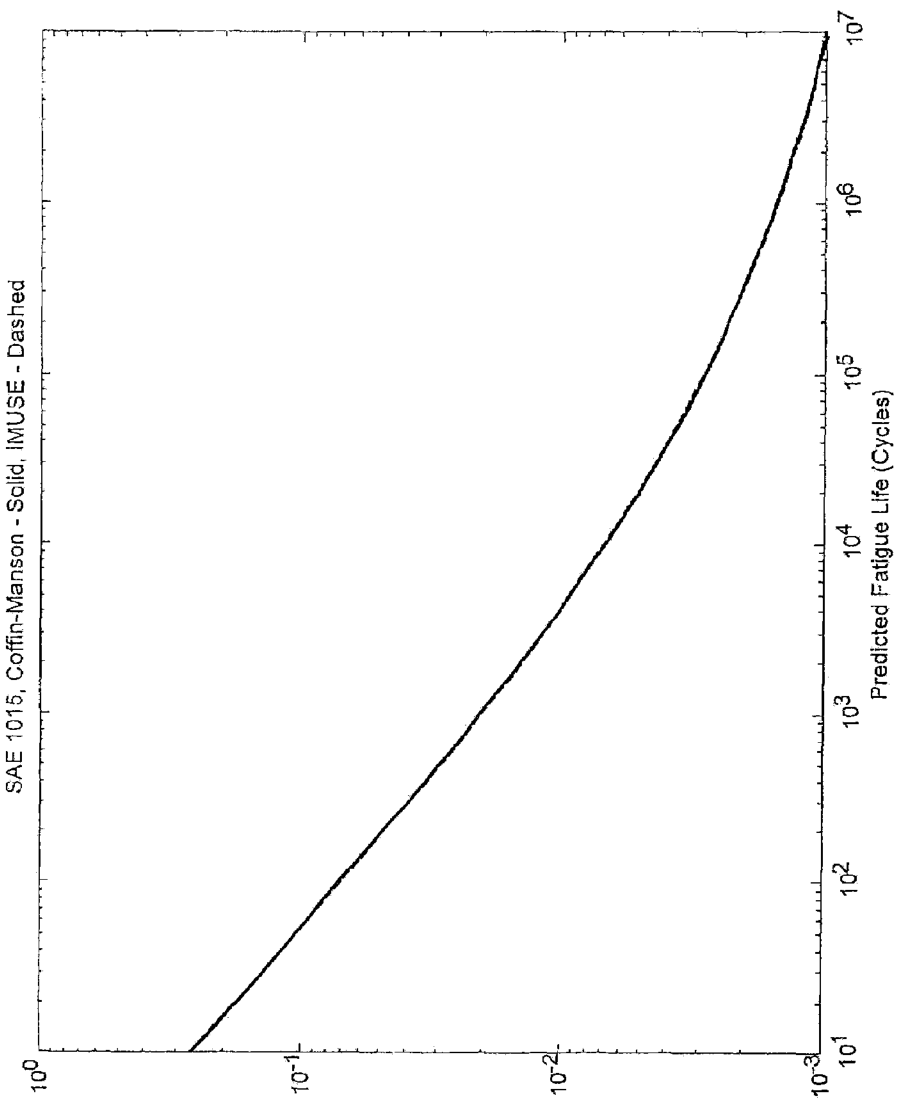
FIG. 14 is a graph illustrating a comparison of predicted fatigue life cycle points for SAE 1015 material that was generated using the iMUSE algorithm (in dashed lines) and the Coffin-Manson algorithm (solid line)
Figure 15:
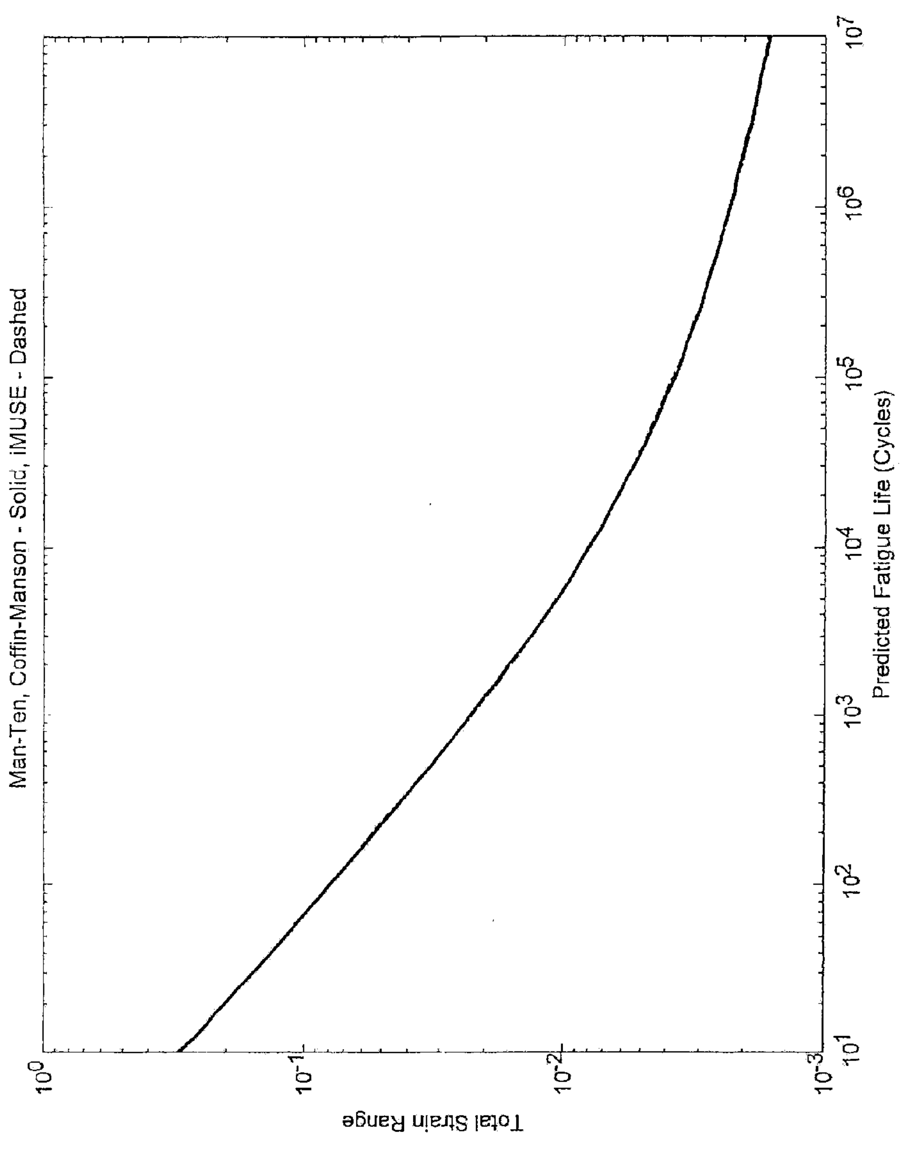
FIG. 15 is a comparison of the fit of predicted fatigue life cycle points for Man-Ten material that was generated using the iMUSE algorithm (shown in dashed lines) and the Coffin-Manson algorithm (solid line)
Figure 16:
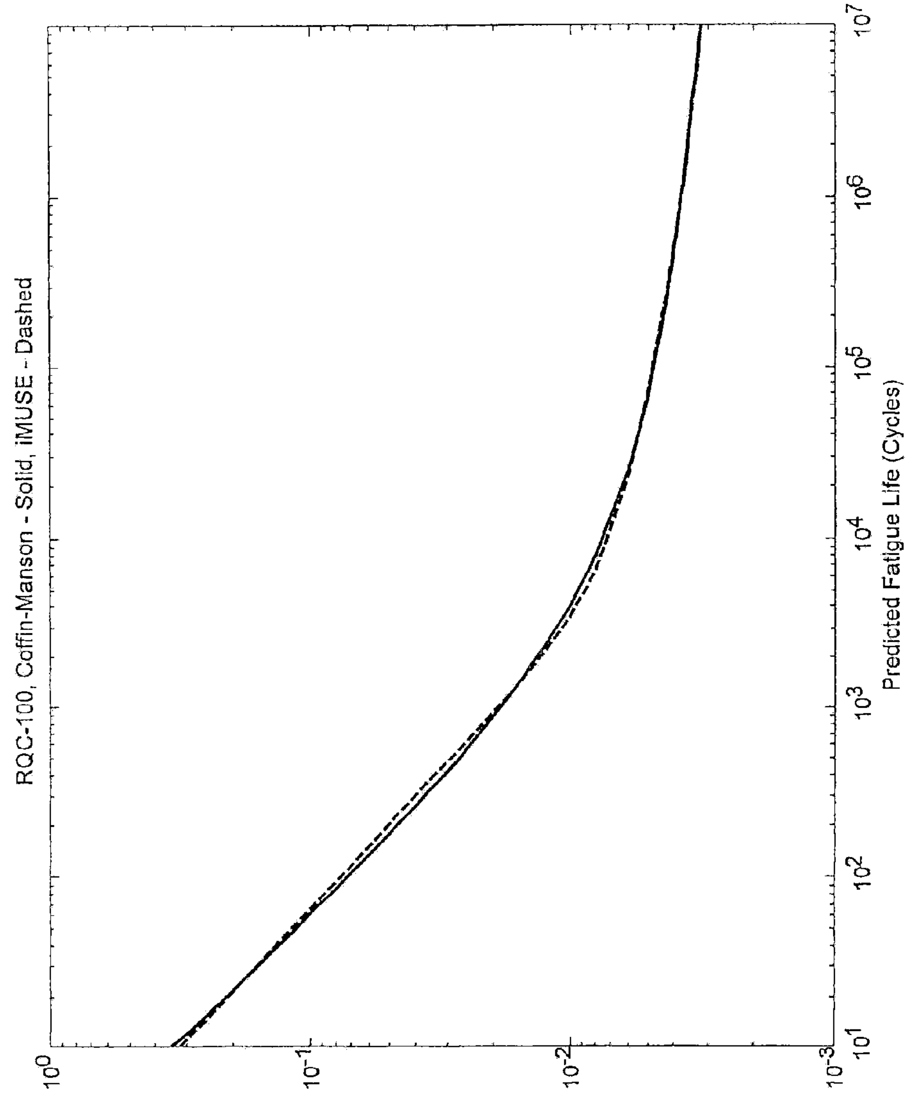
FIG. 16 is a comparison of the fit of predicted fatigue life cycle points for RQC-100 material that was generated using the iMUSE algorithm (in dashed lines) and the Coffin-Manson algorithm (solid line)
Figure 17:
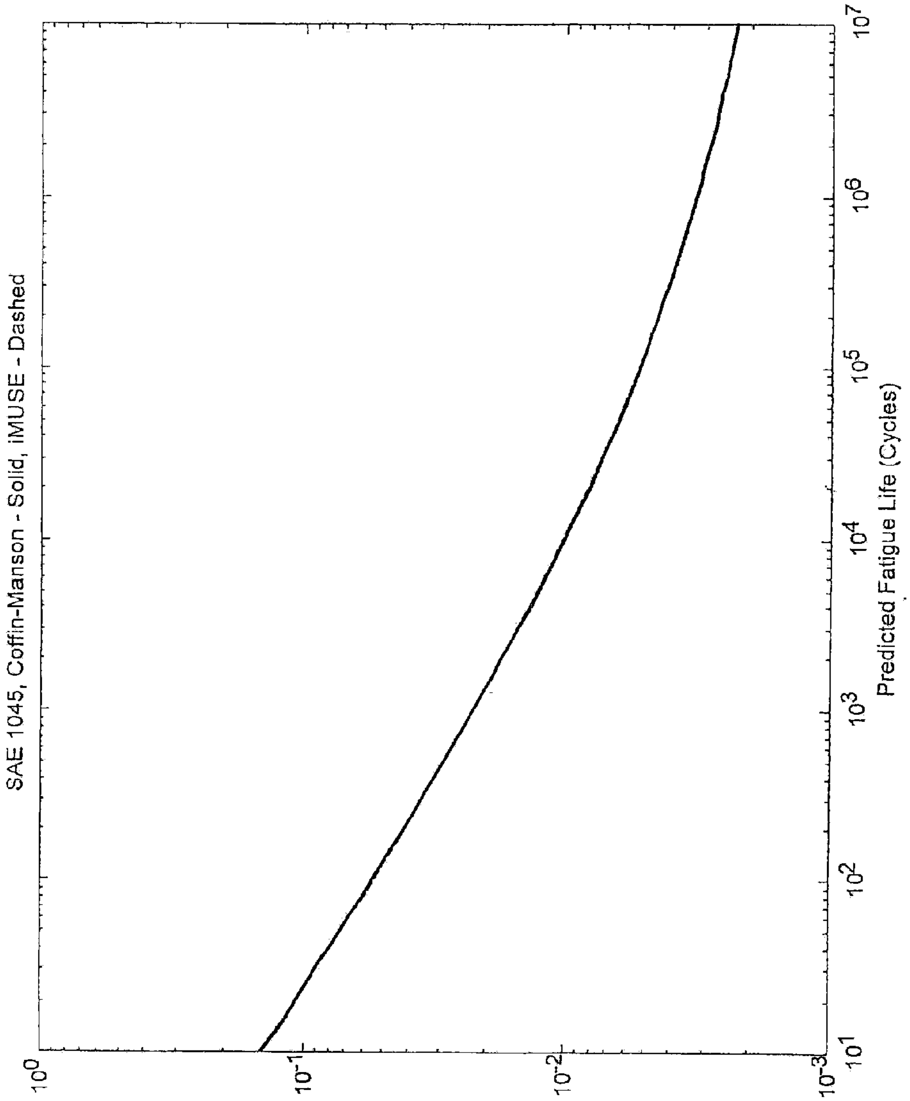
FIG. 17 is a comparison of the fit of predicted fatigue life cycle points for SAE-1045 material that was generated using the iMUSE algorithm (in dashed lines) and the Coffin-Manson algorithm (in solid line)
Figure 15:
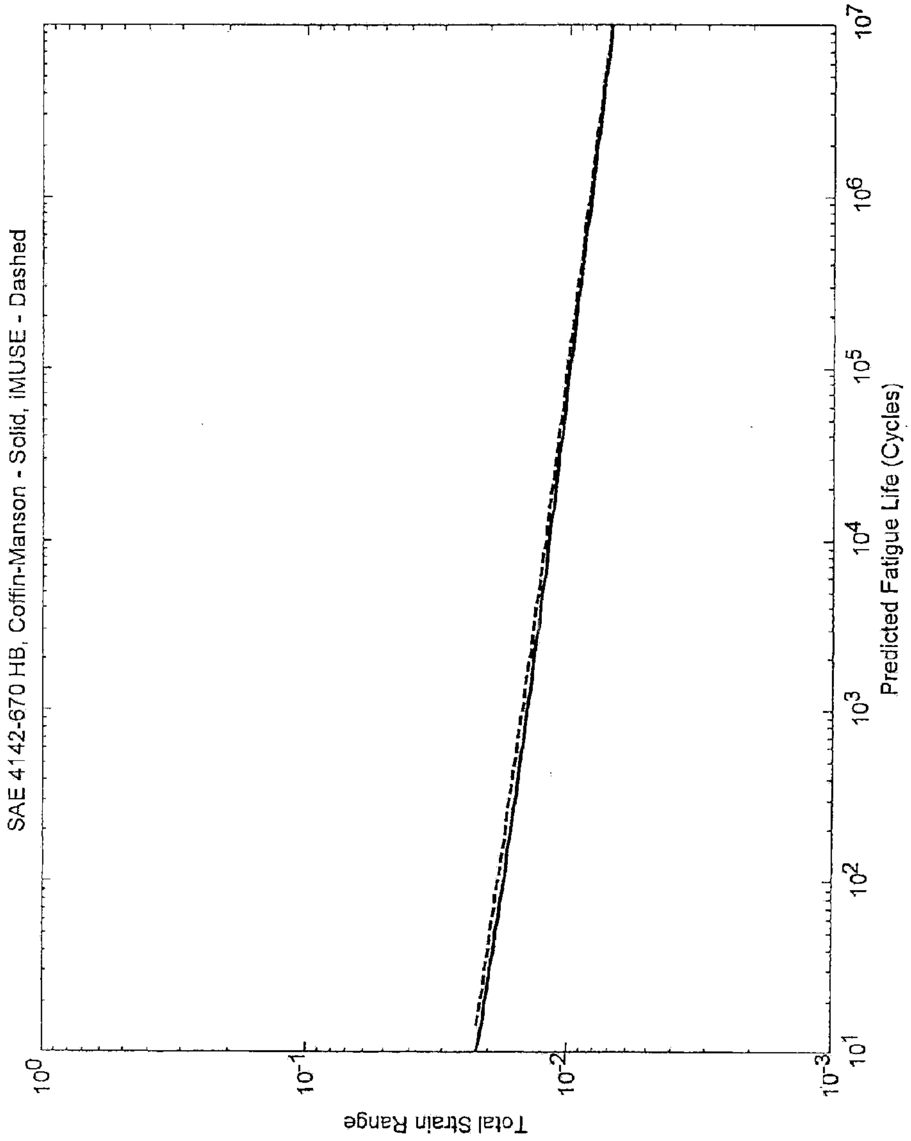
Figure 16:
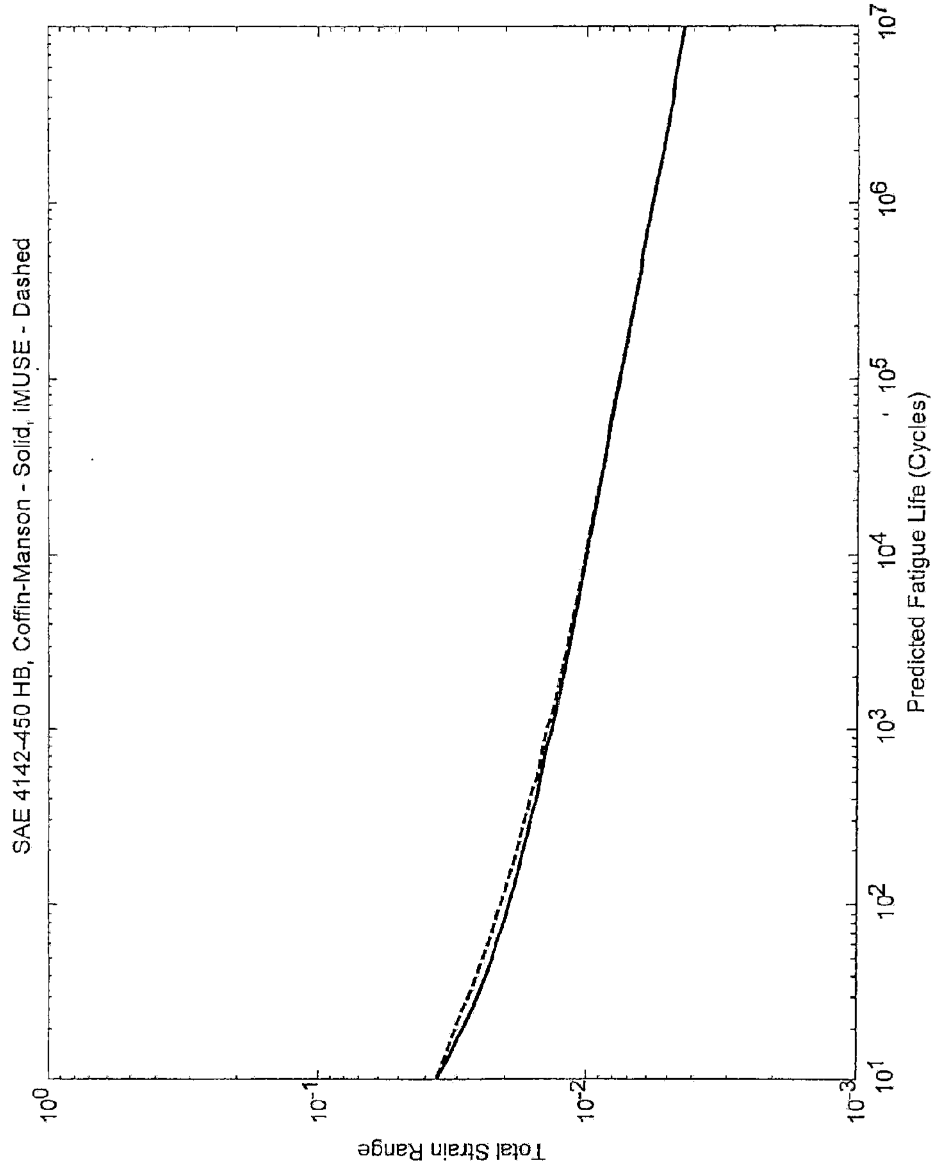

As demonstrated in FIG. 7, the number of strain cycles to fatigue relationship as a function strain range $\Delta\epsilon$ can be accurately approximated by the following inverse relationship:

$$N_f(\Delta\epsilon)=A(\Delta\epsilon-\Delta\epsilon_o)^v+B(\Delta\epsilon)^u. \quad (3)$$

The first term $A(\Delta\epsilon-\Delta\epsilon_o)^v$ dominates the high cycle, or elastic, regime of the relationship and the second terms dominates the low cycle, or plastic, regime. The five parameters A, $\Delta\epsilon_o$, v, B, and u can be determined by analyzing the respective regimes where they dominate the inverse relationship by the following algorithm:

1. Select three points in the high cycle range, where $N_f(\Delta\epsilon)\approx A(\Delta\epsilon-\Delta\epsilon_o)^v$, having the following inter-cycle relationship: $N_{f1}=f_{high}=N_{f2}/x=N_{f3}/x^2$, where x is some constant factor.

Utilizing the algebraic relationships among the approximate formulas at these three points, the values of $\Delta\epsilon$, A, and v can be determined as follows:

$$\begin{aligned}\frac{\ln(N_{f2}/N_{f1})}{\ln(N_{f3}/N_{f2})} &= \frac{\ln(x)}{\ln(x)} \\ &= 1 \\ &= \frac{v\ln((\Delta\varepsilon_2-\Delta\varepsilon_o)/(\Delta\varepsilon_1-\Delta\varepsilon_o))}{v\ln((\Delta\varepsilon_3-\Delta\varepsilon_o)/(\Delta\varepsilon_2-\Delta\varepsilon_o))} \\ &= \frac{\ln((\Delta\varepsilon_2-\Delta\varepsilon_o)/(\Delta\varepsilon_1-\Delta\varepsilon_o))}{\ln((\Delta\varepsilon_3-\Delta\varepsilon_o)/(\Delta\varepsilon_2-\Delta\varepsilon_o))}\end{aligned}$$

$$\rightarrow (\Delta\varepsilon_2-\Delta\varepsilon_o)/(\Delta\varepsilon_1-\Delta\varepsilon_o) = (\Delta\varepsilon_3-\Delta\varepsilon_o)/(\Delta\varepsilon_2-\Delta\varepsilon_o) \rightarrow \Delta\varepsilon_o = \frac{(\Delta\varepsilon_1\Delta\varepsilon_3-\Delta\varepsilon_2^2)}{(\Delta\varepsilon_1-2\Delta\varepsilon_2+\Delta\varepsilon_3)}$$

$$\begin{aligned}\rightarrow v &= \frac{\ln(N_{f2}/N_{f1})}{\ln((\Delta\varepsilon_2-\Delta\varepsilon_o)/(\Delta\varepsilon_1-\Delta\varepsilon_o))} \\ &= \frac{\ln(N_{f3}/N_{f2})}{\ln((\Delta\varepsilon_3-\Delta\varepsilon_o)/(\Delta\varepsilon_2-\Delta\varepsilon_o))} \rightarrow \text{arithmetic average}\end{aligned}$$

-continued $$\to A = \frac{N_{f1}}{(\Delta\varepsilon_1 - \Delta\varepsilon_o)^v} = \frac{N_{f2}}{(\Delta\varepsilon_2 - \Delta\varepsilon_o)^v} = \frac{N_{f3}}{(\Delta\varepsilon_3 - \Delta\varepsilon_o)^v} \to \text{geometric average}$$

The natural logarithm, to base e, is used for purposes of illustration. However, the logarithm to any base can be utilized to determine $\Delta\epsilon_o$, provided that all logarithms used for calculating $\Delta\epsilon_o$ are to the same base. This also applies to the calculation of v.

Having determined the parameters (Δϵ, A, v) for the high cycle portion of the relationship, the parameters B and u can be calculated from two low cycle range points, having the relationship $N_{f4}=f_{low}=N_{f5}/y$ , where y is another constant factor. A logarithm to any base also will work for the calculation of $N_f$.

$$N_{f4,5} = A(\Delta\varepsilon_{4,5} - \Delta\varepsilon_o)^v + B(\Delta\varepsilon_{4,5})^u \to B(\Delta\varepsilon_{4,5})^u = N_{f4,5} - A(\Delta\varepsilon_{4,5} - \Delta\varepsilon_o)^v$$

$$\to u = \frac{\log((N_{f5} - A(\Delta\varepsilon_5 - \Delta\varepsilon_o)^v)/(N_{f4} - A(\Delta\varepsilon_4 - \Delta\varepsilon_o)^v))}{\log(\Delta\varepsilon_5/\Delta\varepsilon_4)}$$

$$\to B = \frac{(N_{f5} - A(\Delta\varepsilon_5 - \Delta\varepsilon_o)^v)}{\Delta\varepsilon_5^u} = \frac{(N_{f4} - A(\Delta\varepsilon_4 - \Delta\varepsilon_o)^v)}{\Delta\varepsilon_4^u} \to \text{geometric average}$$

The fit of the inverse relationship to the original data set can be further improved by a least-squares method as provided by commercially available mathematical analysis software packages such as MATLAB® or MATHEMATICA®.

FIG. 7 illustrates the fatigue curves for 15-5PH stainless steel, and more particularly a comparison of a set of fatigue plots originating from the above-discussed MUSE relationship as applied to the material properties for 15-5PH stainless steel. Note that experimental fatigue data represented by the circles typically exhibit a stochastic spread. Experimentally measured data typically exhibit some degree of randomness with respect to some idealized, or mathematically stated, physical law or trend. For this example, both the calculated inverse MUSE relationship and the least squares optimized fit are close to the original MUSE relationship and show a reasonable fit to the experimental data.

Additional Methodologies With Which the Present System and Method May be Used

The system 10 and method described herein is not only useable with the inverse MUSE relationship, as described above, but is equally well adapted for use with any monotonically decreasing stress-range-life cycle or strain-range-life cycle. The system 10 is equally well adapted for use with any of the following well known methodologies for predicting monotonically decreasing stress and strain range cycles for various types of materials:

Coffin-Manson Four-Point Correlation (1965)

$$\Delta\varepsilon = \Delta\varepsilon_e + \Delta\varepsilon_e = C_e N_f^b + C_p N_f^c$$

-continued

Manson Universal Slopes Equation $$\Delta\varepsilon = \Delta\varepsilon_e + \Delta\varepsilon_e = 3.5\left[\frac{\sigma_u}{E}\right]N_f^{-0.12} + \sigma_f^{0.6}N_f^{-0.6}$$

Mitchell Method (1979)

$$\frac{\Delta\varepsilon}{2} = \frac{\Delta\varepsilon_e}{2} + \frac{\Delta\varepsilon_e}{2} = \left[\frac{\sigma_f'}{E}\right](2N_f)^b + \varepsilon_f'(2N_f)^c$$

Muralidharan and Manson Modified Universal Slopes Equation (1986)

$$\Delta\varepsilon = \Delta\varepsilon_e + \Delta\varepsilon_e = 1.17\left[\frac{\sigma_u}{E}\right]^{0.832}N_f^{-0.09} + 0.0266D^{0.155}\left[\frac{\sigma_u}{E}\right]^{-0.53}N_f^{-0.56}$$

Baumel and Seeger Uniform Material Law (1990)

$$\frac{\Delta\varepsilon}{2} = \frac{\Delta\varepsilon_e}{2} + \frac{\Delta\varepsilon_e}{2} = 1.50\left[\frac{\sigma_u}{E}\right](2N_f)^{-0.087} + 0.59\psi(2N_f)^{-0.58}$$

Ong Modified Four-Point Correlation Method (1993)

$$\frac{\Delta\varepsilon}{2} = \frac{\Delta\varepsilon_e}{2} + \frac{\Delta\varepsilon_e}{2} = \left[\frac{\sigma_f}{E}\right](2N_f)^b + \varepsilon_f(2N_f)^c$$

In addition, the curve fit methodology outlined in the equations above that relate to fitting the iMUSE relation to points on a data plot can be used just as easily for fitting points on a plot of experimentally generated data. More specifically, the curve methodology for fitting the iMUSE relation to points on a data plot, as described herein, is equally applicable to the generation of the five iMUSE parameters for an iMUSE relationship that describe a plot of experimentally generated data.

Curves showing comparisons of predicted fatigue life cycle points for various materials, using both the MUSE and iMUSE algorithms, are presented in FIGS. 8-19.

Summary of Major Operations Performed by the System

Figure 20:
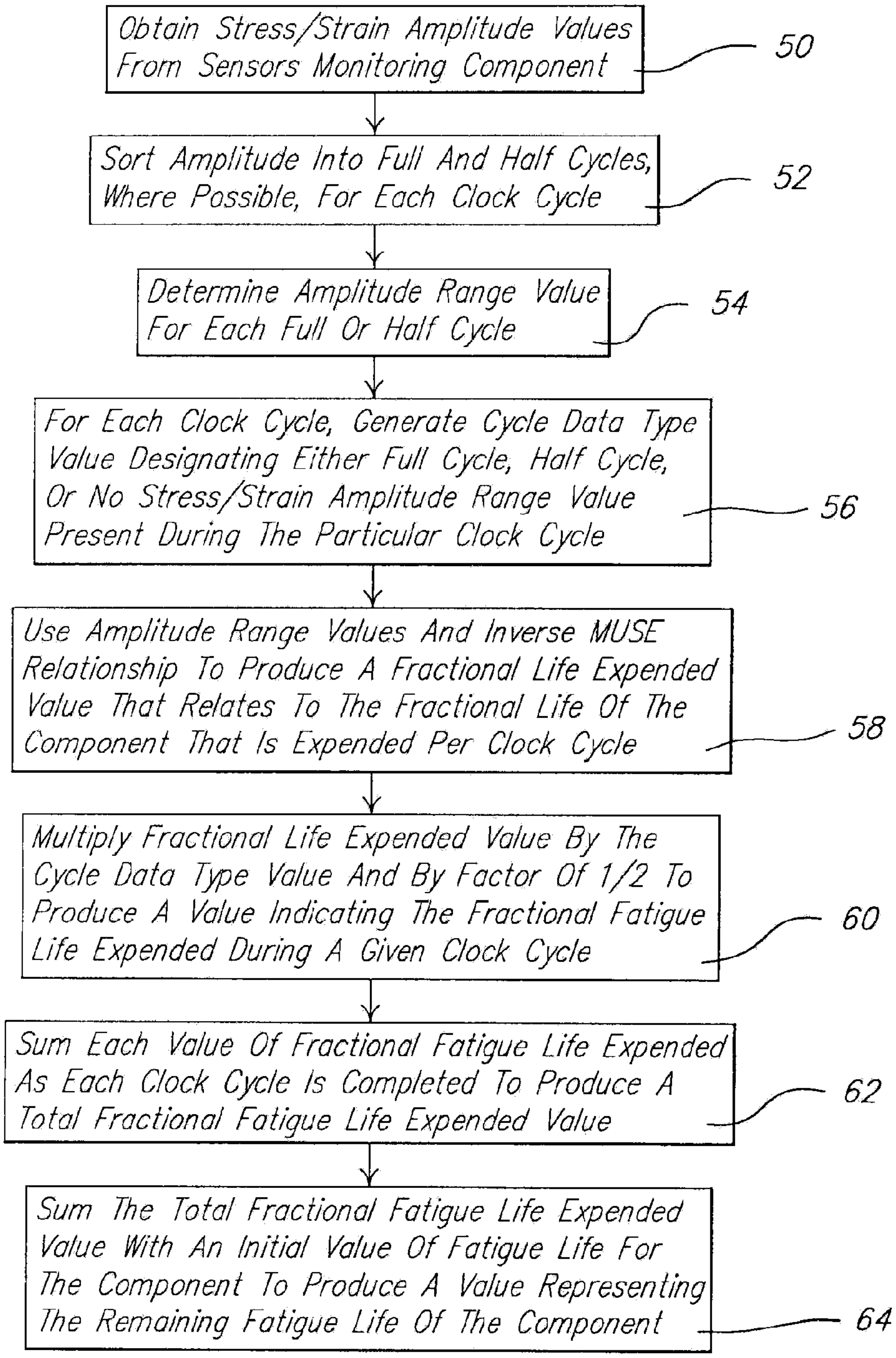
FIG. 20 is a simplified flow chart setting forth the major operations performed by the system and method of the present disclosure.

In view of the foregoing, major operations performed by the system 10 are summarized in the flow chart of FIG. 20. At operation 50, the stress/strain amplitude values from the stress/strain sensors 12 in FIG. 1 are obtained. At operation 52, the stress/strain amplitude values are sorted into maxima and minima pairs, and further sorted into either full or half cycle output from multiplier 20, where possible, at each clock cycle. At operation 54, a stress/strain amplitude range value is generated that represents each full cycle or half cycle of sorted amplitude data, per clock cycle. Again, the amplitude range value at this operation may be zero if no stress/strain amplitude values are being generated by the amplitude analyzing subsystem 14 during a particular clock cycle. At operation 56, for each clock cycle, there is generated a cycle data type value designating whether the amplitude range value being output from the amplitude analyzing subsystem 14 is either the result of a full cycle, a half cycle, or that no stress/strain amplitude range value was created during the particular clock cycle. At operation 58, the amplitude range values are processed by the processor 18, which also takes into account known information on the fatigue properties of the material, in accordance with the inverse MUSE relationship algorithm, to produce an approximate fractional life expended value. The approximate fractional life expended value relates to the approximate fractional fatigue life of the component that is expended per clock cycle. At operation 60, the approximate fractional life expended value obtained at operation 58 is multiplied in multiplier 20 by the cycle data type value, and also by a factor of 0.5, to produce a value indicating the total fractional fatigue life expended during a given clock cycle. At operation 62, each of the total fractional fatigue life values obtained at operation 60 are summed with each clock cycle to produce a total, fractional fatigue life expended value. At operation 64, the total, fractional fatigue life expended value obtained from operation 62 is subtracted from an initial value of fatigue life for the component to produce a value indicating the remaining fatigue life of the component.

The system and method of the present disclosure thus enables substantially real time monitoring and processing of the fatigue life of a component or structure that is expended while the component or structure is experiencing a plurality of fatigue stress/strain cycles. At any given time, an indication of the remaining fatigue life of the component or structure is available for either display, storage or other use. The system and method of the present disclosure can lead to more efficient and cost effective use of various structures and components because it provides information that allows one to even more accurately gauge the remaining fatigue life of the component or structure.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for determining the remaining fatigue life of a component that experiences a cyclic stress/strain, comprising:

monitoring stress/strain of said component and generating a plurality of stress/strain amplitude range values over a plurality of full stress/strain cycles and half stress strain cycles affecting said component;

using a clock and generating said full and half stress/stain cycles for each clock cycle of the clock;

processing the stress/strain amplitude range values together with known fatigue information regarding said component to determine fractions of fatigue life of said component expended as a result of each said full stress/strain cycle and each said half stress/strain cycle; and using said fractions of fatigue life of said component that have been expended during said full and half stress/strain cycles to maintain a record of remaining fatigue life of said component.

2. The method of claim 1, further comprising:

determining if no stress/strain occurred as a result of a given stress/strain cycle.

3. The method of claim 1, wherein said stress/strain amplitude range values each represent a difference between maxima and minima stress strain amplitude values obtained during said monitoring operation.

4. The method of claim 1, wherein using said fractions of fatigue life comprises using a known fatigue life of a material comprising said component, and decrementing said known fatigue life with said fractions of fatigue life expended to periodically update said record of remaining fatigue life.

5. The method of claim 1, wherein processing said stress/strain amplitude range values to determine fractions of fatigue life comprises using an equation:

$$\Delta\varepsilon(N_f) = 0.0266D^{0.155}\left[\frac{\sigma_u}{E}\right]^{-0.53}N_f^{-0.56} + 1.17\left[\frac{\sigma_u}{E}\right]^{0.832}N_f^{-0.09} \quad (1)$$

where $\Delta\epsilon(N_f)$ is the component material strain range (from minimum to maximum values) as a function of the total number of fatigue cycles $N_f$ at that strain range;

D is the ductility of the material determined by D=−In(1−RA);

RA is the fractional reduction in cross-sectional area of a standard tensile test specimen of the material at fracture;

$\sigma_u$ is the ultimate tensile (stress) strength of the material; and

E is the material's Young's modulus of elasticity.

6. A method for determining the remaining fatigue life of a component that experiences a cyclic stress/strain, comprising:

monitoring stress/strain of said component over a plurality of full stress/strain amplitude cycles and half stress/strain amplitude cycles affecting said component and generating a plurality of stress/strain amplitude values;

generating said full and half stress/strain cycles for each clock cycle of a clock;

processing the monitored stress/strain amplitude values to generate a stream of stress/strain amplitude range values, as a function of time;

the stress/strain amplitude range values each representing a difference between maxima and minima stress strain amplitude values occurring in either a half stress/strain amplitude cycle or a full stress/strain amplitude cycle; and using the stress/strain amplitude range values, and a known fatigue life of said component, to determine fractions of fatigue life of said component that are expended during said full and half stress/strain cycles and to maintain a record of fatigue life of said component.

7. The method of claim 6, further comprising decrementing a known, remaining fatigue life value of said component with said expended fractions of fatigue life of said component, to maintain a continuously updated value of remaining fatigue life of said component.

8. The method of claim 6, further comprising:

determining whether each said amplitude stress/strain range value is representative of a full stress/strain cycle;

determining whether each said amplitude stress/strain range value is representative of a half stress/strain cycle; and generating a data type value with each said amplitude stress/strain range value that indicates that said amplitude range value was obtained from either a full stress/strain cycle or a half stress strain cycle.

9. The method of claim 8, further comprising determining if said stress/strain amplitude range value is equal to zero, and generating a data type value in accordance therewith.

10. The method of claim 6, wherein said processing of the monitored stress/strain amplitude values to generate said stress/strain amplitude range values comprises using a cycle counting algorithm.

11. The method of claim 6, further comprising using a clock for generating a plurality of clock cycles, and obtaining one of said stress/strain amplitude range values for each said clock cycle.

12. The method of claim 6, wherein said determining expended fractions of fatigue life comprises using an algorithm that inverts the relationship:

$$\Delta\varepsilon(N_f) = 0.0266D^{0.155}\left[\frac{\sigma_u}{E}\right]^{-0.53}N_f^{-0.56} + 1.17\left[\frac{\sigma_u}{E}\right]^{0.832}N_f^{-0.09} \quad (1)$$

where $\Delta\epsilon(N_f)$ is the component material strain range (from minimum to maximum values) as a function of the total number of fatigue cycles $N_f$ at that strain range, to determine $N_f$ as a function of $\Delta\epsilon$;

D is the ductility of the material determined by D=−In(1−RA);

RA is the fractional reduction in cross-sectional area of a standard tensile test specimen of the material at fracture;

$\sigma_u$ is the ultimate tensile (stress) strength of the material; and

E is the material's Young's modulus of elasticity.

13. A system for monitoring fatigue life of a component, comprising:

a clock for generating a plurality of clock cycles;

a stress/strain subsystem for monitoring stress/strain in said component and generating one stress/strain amplitude value for each said clock cycle;

an amplitude analyzing subsystem that receives said stress/strain amplitude values and sorts maxima and minima stress/strain amplitude values to generate a plurality of stress/strain amplitude range values for each full cycle and each half cycle of detected stress/strain amplitude values, for each said clock cycle; and a processor that receives said stress/strain amplitude range values, and known information on fatigue characteristics of said component, and that generates information representing fractional fatigue life expended for said component, and to further enable a total expenditure of fatigue life to be determined for said component.

14. The system of claim 13, further comprising a summing circuit for receiving said information representing fractional fatigue life, and an initial fatigue life of said component, and generating information indicative of a remaining fatigue life of said component.

15. The system of claim 13, wherein said amplitude analyzing subsystem executes an algorithm that determines if said stress/strain amplitude values were obtained from full cycles or half cycles of stress/strain amplitude values.

16. The system of claim 13, wherein said processor implements an algorithm that inverts the relationship:

$$\Delta\varepsilon(N_f) = 0.0266D^{0.155}\left[\frac{\sigma_u}{E}\right]^{-0.53}N_f^{-0.56} + 1.17\left[\frac{\sigma_u}{E}\right]^{0.832}N_f^{-0.09} \quad (1)$$

where $\Delta\epsilon(N_f)$ is the component material strain range (from minimum to maximum values) as a function of the total number of fatigue cycles $N_f$ at that strain range, to determine $N_f$ as a function of $\Delta\epsilon$;

D is the ductility of the material determined by D=−In(1−RA);

RA is the fractional reduction in cross-sectional area of a standard tensile test specimen of the material at fracture;

$\sigma_u$ is the ultimate tensile (stress) strength of the material; and

E is the material's Young's modulus of elasticity.

17. The system of claim 13, wherein said amplitude analyzing subsystem comprises a subsystem for generating data type values associated with said stress/strain amplitude range values that represent whether each said amplitude stress/strain amplitude range value was obtained from a full or a half cycle of sorted stress/strain amplitude values.

* * * * *